United States Patent
Jo et al.

(10) Patent No.: US 10,741,178 B2
(45) Date of Patent: Aug. 11, 2020

(54) METHOD FOR PROVIDING VEHICLE AI SERVICE AND DEVICE USING THE SAME

(71) Applicant: Obigo Inc., Gyeonggi-do (KR)

(72) Inventors: Ki Hyun Jo, Seoul (KR); Jung Seok Lee, Daegu (KR)

(73) Assignee: Obigo Inc., Gyeonggi-do (KR)

( * ) Notice: Subject to any disclaimer, the term of this patent is extended or adjusted under 35 U.S.C. 154(b) by 262 days.

(21) Appl. No.: 15/903,397

(22) Filed: Feb. 23, 2018

(65) Prior Publication Data
US 2019/0244607 A1 Aug. 8, 2019

(30) Foreign Application Priority Data
Feb. 2, 2018 (KR) .......................... 10-2018-0013489

(51) Int. Cl.
*G10L 15/22* (2006.01)
*G06N 5/04* (2006.01)
*G10L 15/18* (2013.01)

(52) U.S. Cl.
CPC ................ *G10L 15/22* (2013.01); *G06N 5/04* (2013.01); *G10L 15/1815* (2013.01); *G10L 2015/223* (2013.01); *G10L 2015/228* (2013.01)

(58) Field of Classification Search
CPC .................. G10L 15/22; G10L 15/1815; G10L 2015/223; G10L 2015/228; G06N 5/04
See application file for complete search history.

(56) References Cited

U.S. PATENT DOCUMENTS

| | | | |
|---|---|---|---|
| 7,826,945 B2* | 11/2010 | Zhang ....................... | G06F 3/16 701/36 |
| 2009/0164216 A1* | 6/2009 | Chengalvarayan ......................... | B60R 16/0373 704/251 |
| 2012/0016678 A1* | 1/2012 | Gruber .................... | G10L 13/02 704/275 |
| 2016/0078860 A1* | 3/2016 | Paulik ................... | G10L 15/063 704/244 |

* cited by examiner

*Primary Examiner* — Nafiz E Hoque
(74) *Attorney, Agent, or Firm* — Husch Blackwell LLP

(57) ABSTRACT

A method for providing a vehicle AI service is provided. The method includes steps of: an AI service providing device (a) supporting an AI server to extract from a voice of a user (i) at least one of skill candidates including service categories and (ii) at least one of command candidates, to create voice analysis data, and receiving it from the AI server; and (b) (I) analyzing at least one of (i) the voice analysis data, (ii) second data created by analyzing voices of other users within a certain time, (iii) third data created by analyzing voices of the user within a particular time, and (iv) fourth data having information on context of the user, and (II) recognizing an intention included in the voice and determining a final skill and a final command matching the intention; wherein each of the data includes the skill candidates and the command candidates.

14 Claims, 4 Drawing Sheets

| 210 | 220 | 230 | 240 | 250 | 260 | 270 |
|---|---|---|---|---|---|---|
| DATA | WEIGHT FACTOR | CANDIDATE GROUP | CANDIDATE NUMBER | DETAILS | SCORE | WEIGHT FACTOR × SCORE |
| 1ST DATA | 5 | SKILL CANDIDATES | (1-1)ST | WEATHER | 0.80 | 4.00 |
| | | | (1-2)ND | MUSIC | 0.10 | 0.50 |
| | | COMMAND CANDIDATES | (1-1)ST | TELL ME | 0.90 | 4.50 |
| | | | (1-2)ND | PLAY IT | 0.05 | 0.25 |
| 2ND DATA | 1 | SKILL CANDIDATES | (2-1)ST | NEWS | 0.50 | 0.50 |
| | | | (2-2)ND | MUSIC | 0.20 | 0.20 |
| | | | (2-3)RD | RADIO | 0.25 | 0.25 |
| | | | (2-4)TH | VIRTUAL CURRENCY | 0.05 | 0.05 |
| | | COMMAND CANDIDATES | (2-1)ST | TELL ME | 0.30 | 0.30 |
| | | | (2-2)ND | INFO | 0.30 | 0.30 |
| | | | (2-3)RD | PLAY | 0.20 | 0.20 |
| 3RD DATA | 2 | SKILL CANDIDATES | (3-1)ST | WEATHER | 0.20 | 0.40 |
| | | | (3-2)ND | NAVIGATION | 0.60 | 1.20 |
| | | | (3-3)RD | GAS STATION | 0.10 | 0.20 |
| | | COMMAND CANDIDATES | (3-1)ST | INFO | 0.50 | 1.00 |
| | | | (3-2)ND | WHERE | 0.20 | 0.40 |
| 4TH DATA | 2 | SKILL CANDIDATES | (4-1)ST | MUSIC | 0.05 | 0.10 |
| | | | (4-2)ND | NAVIGATION | 0.95 | 1.90 |
| | | COMMAND CANDIDATES | (4-1)ST | TELL ME | 0.40 | 0.80 |
| | | | (4-2)ND | PLAY IT | 0.40 | 0.80 |

FIG. 2

| 210 DATA | 220 WEIGHT FACTOR | 230 CANDIDATE GROUP | 240 CANDIDATE NUMBER | 250 DETAILS | 260 SCORE | 270 WEIGHT FACTOR × SCORE |
|---|---|---|---|---|---|---|
| 1ST DATA | 5 | SKILL CANDIDATES | (1-1)ST | WEATHER | 0.80 | 4.00 |
| | | | (1-2)ND | MUSIC | 0.10 | 0.50 |
| | | COMMAND CANDIDATES | (1-1)ST | TELL ME | 0.90 | 4.50 |
| | | | (1-2)ND | PLAY IT | 0.05 | 0.25 |
| 2ND DATA | 1 | SKILL CANDIDATES | (2-1)ST | NEWS | 0.50 | 0.50 |
| | | | (2-2)ND | MUSIC | 0.20 | 0.20 |
| | | | (2-3)RD | RADIO | 0.25 | 0.25 |
| | | | (2-4)TH | VIRTUAL CURRENCY | 0.05 | 0.05 |
| | | COMMAND CANDIDATES | (2-1)ST | TELL ME | 0.30 | 0.30 |
| | | | (2-2)ND | INFO | 0.30 | 0.30 |
| | | | (2-3)RD | PLAY | 0.20 | 0.20 |
| 3RD DATA | 2 | SKILL CANDIDATES | (3-1)ST | WEATHER | 0.20 | 0.40 |
| | | | (3-2)ND | NAVIGATION | 0.60 | 1.20 |
| | | | (3-3)RD | GAS STATION | 0.10 | 0.20 |
| | | COMMAND CANDIDATES | (3-1)ST | INFO | 0.50 | 1.00 |
| | | | (3-2)ND | WHERE | 0.20 | 0.40 |
| 4TH DATA | 2 | SKILL CANDIDATES | (4-1)ST | MUSIC | 0.05 | 0.10 |
| | | | (4-2)ND | NAVIGATION | 0.95 | 1.90 |
| | | COMMAND CANDIDATES | (4-1)ST | TELL ME | 0.40 | 0.80 |
| | | | (4-2)ND | PLAY IT | 0.40 | 0.80 |

FIG. 3A

| SKILL CANDIDATE NUMBER | DETAILS | MATCHING SCORE NUMBER | CALCULATION | MATCHING SCORE |
|---|---|---|---|---|
| 1ST SKILL CANDIDATE | WEATHER | 1ST MATCHING SCORE | 4.00 + 0.40 | 4.40 |
| 2ND SKILL CANDIDATE | MUSIC | 2ND MATCHING SCORE | 0.50 + 0.20 + 0.10 | 0.80 |
| 3RD SKILL CANDIDATE | NEWS | 3RD MATCHING SCORE | 0.50 | 0.50 |

| COMMAND CANDIDATE NUMBER | DETAILS | MATCHING SCORE NUMBER | CALCULATION | MATCHING SCORE |
|---|---|---|---|---|
| 1ST COMMAND CANDIDATE | PLAY IT | 1ST MATCHING SCORE | 0.25 + 0.80 | 1.05 |
| 2ND COMMAND CANDIDATE | INFO | 2ND MATCHING SCORE | 0.30 + 1.00 | 1.30 |

310B 320B 330B 340B 350B

METHOD FOR PROVIDING VEHICLE AI SERVICE AND DEVICE USING THE SAME

CROSS REFERENCE TO RELATED APPLICATION

This application claims priority to and incorporates herein by reference all disclosure in Korean patent application no. 10-2018-0013489 filed Feb. 2, 2018.

FIELD OF THE INVENTION

The present invention relates to a method for providing a vehicle AI service; and more particularly, to the method of (a) an AI service providing device, if a voice of a specific user is acquired from a voice receiver, supporting an AI server to extract from the voice (i) at least one of skill candidates each of which includes a service category and (ii) at least one of command candidates, to thereby create voice analysis data, and receiving the voice analysis data from the AI server; and (b) the AI service providing device (I) analyzing at least one of (i) first data including the voice analysis data, (ii) second data including real-time trend data created by analyzing voices of other users acquired within a certain time period, (iii) third data including user history data created by analyzing voices of the specific user acquired within a particular time period, and (iv) fourth data including situation data having information on context of the specific user, and then (II) recognizing an intention included in the voice of the specific user acquired at the step of (a) and determining a final skill and a final command which match the intention; where each of the first data, the second data, the third data, and the fourth data includes at least one of the skill candidates and at least one of the command candidates.

BACKGROUND OF THE INVENTION

An artificial intelligence, i.e., AI, service, used in conventional vehicles recognizes an intention of a user by analyzing a voice of the user, to thereby provide a service corresponding to the intention analyzed as the user's request. Herein, if the voice of the user is unclear, e.g., if there is redundant chunks of meaning in a sentence or if the user's pronunciation is incorrect, the request of the user may be hard to recognize.

For example, when the user says a word "AAA", and if there is a place called "AAA" and also a song of the title "AAA", then the user may be provided with an unwanted service. For another example, if the user makes a request saying "Find a gas station with a cheap price", the service may suggest a gas station with cheap diesel while the user's car runs on gasoline.

Therefore, the inventor proposes a method for providing a vehicle AI service and a device using the same to identify the request of the user more accurately.

SUMMARY OF THE INVENTION

It is an object of the present invention to solve all the aforementioned problems.

It is another object of the present invention to accurately identify an intention of a user by analyzing preliminary voice analysis data by an AI server, real-time trend data created by analyzing voices of other users, user history data created by analyzing voices of the user, and situation data including information on context of the user, etc.

It is still another object of the present invention to accurately identify a request of the user by analyzing results of multiple intentions included in each data and matching scores representing suitabilities of each of the results by using a certain algorithm.

In accordance with one aspect of the present invention, there is provided a method for providing a vehicle AI service, including steps of: (a) an AI service providing device, if a voice of a specific user is acquired from a voice receiver, supporting an AI server to extract from the voice (i) at least one of skill candidates each of which includes a service category and (ii) at least one of command candidates, to thereby create voice analysis data, and receiving the voice analysis data from the AI server; and (b) the AI service providing device (I) analyzing at least one of (i) first data including the voice analysis data, (ii) second data including real-time trend data created by analyzing voices of other users acquired within a certain time period, (iii) third data including user history data created by analyzing voices of the specific user acquired within a particular time period, and (iv) fourth data including situation data having information on context of the specific user, and then (II) recognizing an intention included in the voice of the specific user acquired at the step of (a) and determining a final skill and a final command which match the intention; wherein each of the first data, the second data, the third data, and the fourth data includes at least one of the skill candidates and at least one of the command candidates.

In accordance with another aspect of the present invention, there is provided an AI service providing device for providing a vehicle AI service, including: a communication part for receiving voice analysis data from an AI server if the AI server acquires a voice of a specific user from a voice receiver, and extract from the voice (i) at least one of skill candidates each of which includes a service category and (ii) at least one of command candidates, to thereby create the voice analysis data; and a processor for (I) analyzing at least one of (i) first data including the voice analysis data, (ii) second data including real-time trend data created by analyzing voices of other users acquired within a certain time period, (iii) third data including user history data created by analyzing voices of the specific user acquired within a particular time period, and (iv) fourth data including situation data having information on context of the specific user, and then (II) recognizing an intention included in the voice of the specific user acquired from the communication part and determining a final skill and a final command which match the intention; wherein each of the first data, the second data, the third data, and the fourth data includes at least one of the skill candidates and at least one of the command candidates.

BRIEF DESCRIPTION OF THE DRAWINGS

The above and other objects and features of the present invention will become apparent from the following description of preferred embodiments given in conjunction with the accompanying drawings, in which:

FIG. 2 is a diagram schematically illustrating a method for analyzing an intention of a user according to weight factors for each of data and matching scores of each of skill candidates and command candidates in accordance with one example embodiment of the present invention.

FIGS. 3A and 3B are diagrams schematically illustrating a method for calculating matching scores in accordance with one example embodiment of the present invention.

DETAILED DESCRIPTION OF THE PREFERRED EMBODIMENTS

Figure 1:
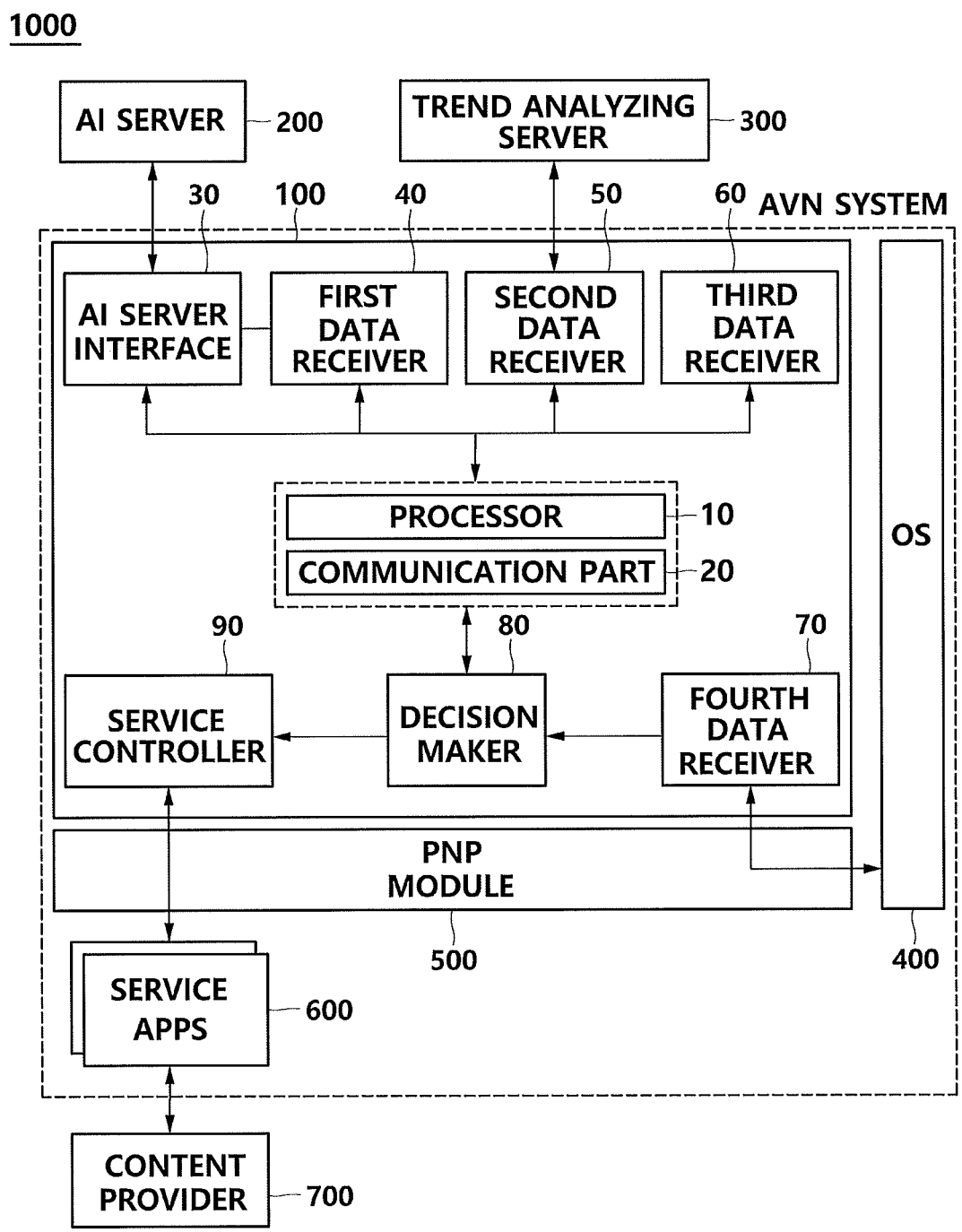
FIG. 1 is a configuration diagram schematically illustrating a service system providing a vehicle AI service in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention.

In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

Hereinafter, a singular term "a user" represents "a specific user", unless otherwise noted.

FIG. 1 schematically illustrates a service system 1000 providing a vehicle AI service in accordance with one example embodiment of the present invention.

By referring to FIG. 1, the service system 1000 may include an AI service providing device 100, an AI server 200 and a trend analyzing server 300, etc. Herein, the AI service providing device 100 is illustrated in FIG. 1 as being included in an AVN system, i.e., Audio Visual and Navigation system, of a vehicle and externally communicating with the AI server 200 and the trend analyzing server 300. However, this is for convenience of understanding. As another examples, the AI service providing device 100 may include the AI server 200 and the trend analyzing server 300, or the AI service providing device 100 may be a standalone device, e.g., a tablet or a smartphone, outside of the AVN system and may provide an AI service in connection with the vehicle.

First, the AI service providing device 100 may include a processor 10 and a communication part 20. Herein, the AI service providing device 100 may further include an interface 30 with the AI server, a first data receiver 40 which may receive first data including voice analysis data, a second data receiver 50 which may receive second data including real-time trend data created by analyzing voices of other users acquired within a certain time period, a third data receiver 60 which may receive third data including user history data, a fourth data receiver 70 which may receive fourth data including situation data, a decision maker 80, and a service controller, but at least part of these may not be necessary. These may be the processor 10 and the communication part 20 per se. As another example, these may control various devices according to instructions from the processor 10 while communicating with the processor 10 and the communication part 20.

Specifically, the AI service providing device 100 may (i) transmit a voice of a specific user to the AI server 200 via the communication part 20 if the voice is acquired from a voice receiver (not illustrated) connected to the vehicle or the AI service providing device 100, and (ii) receive the voice analysis data if one or more skill candidates and one or more command candidates are extracted from the voice, and as a result, the voice analysis data is created. Herein, communications between the AI service providing device 100 and the AI server 200 may be performed via the communication part 20, or in connection with the interface 30 and the first data receiver 40.

Meanwhile, the AI server 200 may perform functions of STT (Speech-to-Text), NLP (Natural Language Processing), TTS (Text-to-Speech), etc. Through these processes, the AI server 200 may (i) interpret and convert vocal language of the user to text data, (ii) analyze meaning of the voice and an intention of the user contained therein using morpheme analysis, phrase analysis, analysis of speech act, conversation processing, etc., and (iii) extract and transmit the skill candidates and the command candidates based on the result of the analyses to the AI service providing device 100.

According to the conventional AI services, an AI server transmits a single final result of analyzing the intention to the vehicle or a device connected to the vehicle, as opposed to the present invention where the AI server 200 transmits the voice analysis data, including a plurality of the skill candidates and the command candidates to the AI service providing device 100 which then further preforms refined analysis for identifying the intention.

Herein, the skill candidates extracted by the AI server 200 may include service categories like apps, contents, or domains that can be run on the vehicle or the AI service providing device 100. For example, weather, music, time, news, radio, navigation, locations, stocks, persons, and phone numbers may become the skill candidates, but the scope of the skill candidates in the present invention is not limited thereto.

Further, the command candidates may include commands executable on the vehicle or the AI service providing device 100. For example, the command candidates may include commands regarding various means like "play it", "find it (searching)", "play" that can execute the skill candidates, or commands regarding control methods like "lock it", but the scope of the command candidates in the present invention is not limited thereto.

Next, the processor 10 of the AI service providing device 100 may (I) analyze at least one of (i) the first data including the voice analysis data, (ii) the second data including real-time trend data created by analyzing the voices of other users acquired within a certain time period, (iii) third data including the user history data created by analyzing voices of the specific user acquired within a particular time period, and (iv) fourth data including situation data having information on context of the specific user, and then (II) recognizing an intention included in the voice of the specific user and may determine a final skill and a final command which match the intention.

Herein, each of the first data, the second data, the third data, and the fourth data, includes at least one of the skill candidates and at least one of the command candidates. Explanation on details of the skill candidates and the command candidates is omitted, as it is similar to the explanation aforementioned on the voice analysis data.

Meanwhile, the second data may include sentences for AI services, the skill candidates and the command candidates, analyzed as used a lot recently by other users via the trend analyzing server 300. For example, the second data may reflect keywords of recent issues like news, sports games, natural disasters and accidents.

Further, by analyzing the real-time trend data of other users with personal information, e.g., an age, a gender, and an occupation, similar to that of the specific user, the processor 10 may identify the intention of the user more accurately. Herein, communications between the trend analyzing server 300 and the processor 10 may be performed via the second data receiver 50 or the communication part 20.

Next, the third data 60 may include information created by analyzing the voices of the specific user acquired under past situations, similar to current situations, including a time period containing at least one of the current time, an area containing the current location, persons similar to those currently around the specific user, and an object similar to those currently gazed upon. The result of analysis of the voice and the intention may be stored in a database.

By using the third data, for example, if the analysis indicates that the user has frequently listened to a certain radio station during a specific time period, the processor 10 may instruct a radio to tune in to the certain radio station if the user says only a word "radio."

Taking another example, when the user says a word "americano", the processor 10 may instruct a navigation app to set a certain coffee shop as a destination if the analysis indicates that the user usually visits the certain coffee shop, as a POI, near the current location, at similar points of time, even if a song with the title "americano" is in the user's playlist.

Next, the fourth data may include at least one of (i) vehicle information on at least one of a model name of a vehicle and a type of its engine, for example, information on whether the engine requires gasoline, diesel, LPG or electricity; (ii) driving information on at least one of speed of the vehicle, its transmission operating mode, and its parking state; (iii) geographic information on at least one of a location of the vehicle, direction of the vehicle and a name of a road on which the vehicle is in operation; (iv) situation information on at least one of the current time and current weather; and (v) app information on at least one application currently being executed in a device installed in or connected with the vehicle.

By using the fourth data, if the user makes a request saying "Find a gas station with a cheap price", the processor 10 may instruct the navigation app to set a gas station with the cheapest LPG price in the vicinity as a destination if the user's vehicle runs on LPG.

Herein, the fourth data receiver 70 or the processor 10 may collect various information including an operating state of the vehicle and gestures of the user on the basis of OS 400, to thereby create and manage the fourth data.

By analyzing the first, the second, the third, and the fourth data, the processor 10 or the decision maker 80 may (i) recognize the intention, (ii) select the final skill and the final command that match the intention from the skill candidates and the command candidates, and (iii) instruct the service controller 90 to control service apps 600 of the vehicle or the AI service providing device 100, to thereby provide for contents requested by the user via the content provider 700.

Next, by referring to FIGS. 2, 3A, and 3B, a method for calculating matching scores and a method for analyzing the intention of the user according to weight factors for each of data and matching scores of each of skill candidates and command candidates in accordance with one example embodiment of the present invention are disclosed.

Herein, the weight factors may mean contributions each of data has for analysis of the intention and each of the weight factors may be determined initially by experiments, however, each of them may be adjusted for accuracy of the analysis as the data accumulates.

First, each of m-th data 210 $\{m|m \in 1, 2, 3, 4\}$ includes (i) information on each of (m-k)-th skill scores 260 which represents an extent of the intention analyzed for each of (m-k)-th skill candidates 240 $\{k|k \in 1, 2, 3, \ldots, k_k\}$ and (ii) information on each of (m-n)-th command scores 260 $\{n|n \in 1, 2, 3, \ldots, n_k\}$ which represents an extent of the intention analyzed for each of (m-n)-th command candidates 240. Herein, subscripts k and n are natural numbers that range from 1 to a cardinal number of the skill candidates and to the command candidates, respectively.

For example, by referring to FIG. 2, the skill candidates 240 of the first data include a (1-1)st skill candidate, i.e., "weather", and a (1-2)nd skill candidate, i.e., "music", and the values 260 of these skill candidates are 0.80 and 0.10 respectively.

In accordance with one example of the present invention, if a score of a specific command candidate is highest among (1-k)-th skill scores and (1-n)-th command scores included in the first data, the processor 10 may determine the specific command candidate as the final command, and select the final skill from at least part of the skill candidates capable of executing commands corresponding to the specific command candidate.

That is, by referring to FIG. 2, the processor 10 may determine "tell me" as the final command if the (1-1)st command candidate, i.e., "tell me", corresponds to a candidate with the highest score, among the score 0.80 of the (1-1)st skill candidate, i.e., "weather", the score 0.10 of the (1-2)nd skill candidate, i.e., "music", the score 0.90 of the (1-1)st command candidate, i.e., "tell me", and the score 0.05 of the (1-2)nd command candidate, i.e., "play it."

Herein, by referring to FIG. 3A, if it is assumed that a-th skill candidates $\{a|a \in 1, 2, 3, \ldots, a_k\}$ correspond to the at least part 310A of the skill candidates capable of executing commands corresponding to the specific command candidate determined as the final command, the processor 10 may calculate each of a-th matching scores 330A corresponding to the intention, for each of the a-th skill candidates, by referring to the weight factors 220 which are weight factors of the respective m-th data. Herein, the ak may be a cardinal number of the at least part of the skill candidates 310A.

Specifically, the a-th matching scores 330A $\{a|a \in 1, 2, 3, \ldots, a_k\}$ may be calculated by respective summations of multiplications of the m-th weight factor 220 $\{m|m \in 1, 2, 3, 4\}$ by each skill score 260 of the m-th data $\{m|m \in 1, 2, 3, 4\}$ corresponding to each of the a-th skill candidates 310A $\{a|a \in 1, 2, 3, \ldots, a_k\}$, and the processor 10 may determine a specific skill candidate with the highest score among the respective a-th matching scores 330A as the final skill.

That is, by referring to FIG. 3A, if the final command is "tell me" and the at least part 310A of the skill candidates capable of executing commands corresponding to "tell me" are the first skill candidate, i.e., "weather", the second skill candidate, i.e., "music", and the third skill candidate, i.e., "news", each of the matching scores 350A may be calculated for each skill candidate 310A.

In case of the first skill candidate, by referring to FIG. 2, "weather" is shown as skill candidates of the first and the third data. Herein, the first matching score is determined as the summation of 4.00 which is a multiplication of the weight factor 5 of the first data by 0.80 which is the score of the (1-1)st skill candidate, and 0.40 which is a multiplication of the weight factor 2 of the third data by 0.20 which is the score of the (3-1)st skill candidate.

If the matching scores for the second skill candidate and the third skill candidate are calculated as such, the second matching score is 0.80 and the third matching score is 0.50. Therefore the first skill candidate, i.e., "weather", corresponding to 4.40 which is the highest score among the first matching score, the second matching score, and the third matching score, may be determined as the final skill.

Meanwhile, if a score of a specific skill candidate is highest among (1-k)-th skill scores and (1-n)-th command scores included in the first data, i.e., the voice analysis data, the processor 10 may determine the specific skill candidate as the final skill, and select the final command from the at least part of the command candidates capable of performing one or more skills corresponding to the specific skill candidate.

Herein, by referring to FIG. 3B, if it is assumed that a-th command candidates $\{a|a \in 1, 2, 3, \ldots, a_k\}$ correspond to the at least part of the command candidates 310B capable of performing skills corresponding to the specific skill candidate, the processor 10 may calculate each of a-th matching scores 330B corresponding to the intention, for each of the a-th command candidates 310B, by referring to the weight factors 220 which are weight factors of the respective m-th data 210, to thereby determine a specific command candidate with the highest score among the a-th matching scores 350B as the final command, where the respective a-th matching scores 350B include respective summations of multiplications of the m-th weight factor 220 by each score 260 of the m-th data corresponding to each of the a-th command candidates 310B. Herein, the ak may be a cardinal number of the at least part of the command candidates 310A.

Meanwhile, in accordance with another example of the present invention, if a specific command candidate has the highest value among each of multiplications 270 of (m-k)-th skill scores by the m-th weight factors and each of multiplications 270 of (m-n)-th command scores by the m-th weight factors, the processor 10 may determine the specific command candidate as the final command, and select the final skill from at least part of the skill candidates capable of executing commands corresponding to the specific command candidate.

Further, if a specific skill candidate has the highest value among each of multiplications 270 of (m-k)-th skill scores by the m-th weight factors and each of multiplications 270 of (m-n)-th command scores by the m-th weight factors, the processor 10 may determine the specific skill candidate as the final skill, and select the final command from at least part of the command candidates capable of performing skills corresponding to the specific skill candidate.

For example, by referring to FIG. 2, among multiplied values 270 of the weight factors by the scores, that of the (1-1)st command candidate is the highest, which is the command candidate of the first data. In this case, "tell me" may be determined as the final command, and the final skill may be selected among the skill candidates capable of executing commands corresponding to "tell me."

In accordance with still another example of the present invention, if a score of a specific command candidate is highest among each of the (m-k)-th skill scores 260 and each of the (m-n)-th command scores 260, the processor 10 may determine the specific command candidate as the final command, and select the final skill from the at least part of the skill candidates capable of executing one or more commands corresponding to the specific command candidate. Also, if a score of a specific skill candidate is highest among each of the (m-k)-th skill scores 260 and each of the (m-n)-th command scores 260, the processor 10 may determine the specific skill candidate as the final skill, and select the final command from the at least part of the command candidates capable of performing one or more skills corresponding to the specific skill candidate.

For example, by referring to FIG. 2, the score of the (4-2)nd skill candidate, i.e., "navigation", is 0.95, that is, the highest among the (m-k)-th skill scores 260 and the (m-n)-th command scores 260, and accordingly, the processor 10 may determine "navigation" as the final skill.

Herein, by referring to FIG. 3B, if the at least part 310B of the command candidates capable of performing the "navigation" skill are the first command candidate, i.e., "play it", and the second command candidate, i.e., "info", each of the matching scores 350B may be calculated for each command candidate 310B.

In case of the first command candidate, by referring to FIG. 2, "play it" may be seen as the command candidates of the first and the fourth data. Herein, the first matching score is determined as the summation of 0.25 which is a multiplication of the weight factor 5 of the first data by 0.05 which is the score of the (1-2)nd command candidate, and 0.80 which is a multiplication of the weight factor 2 of the fourth data by 0.40 which is the score of the (4-2)nd command candidate.

For example, if the matching score for the second command candidate, i.e., "info", is calculated as such, the second matching score is 1.30. Therefore the second command candidate which has a score larger than 1.05 of the first matching score may be determined as the final command.

Meanwhile, the service system 1000 providing the vehicle AI service in accordance with one example of the present invention may further include a PnP module 500. The PnP module 500 may perform a function of transmitting availability of hardware and software connected to the service system 1000, using a plug-and-play process. Therefore, the hardware, its services, and services of applications in a software framework may be registered.

Specifically, if a new app is installed on the AI service providing device 100, its connected vehicle, or its connected device, then an AI service provided by the new app may be published, and skills and commands related to the AI service may be registered, by the PnP module 500.

Herein, if no information on the skills and commands of the new app exists on the AI service providing device 100, the PnP module 500 or the processor 10 may download the information on the skills and commands from an external server.

That is, conventional AI service technologies are based on services performed in a limited range permitted by a platform providing the AI services, not based on applications. Meanwhile, in accordance with the present invention, the PnP module 500 supports dynamic addition and removal of an AI service according to addition, removal, and update of the apps, therefore, expansion of the AI service and mash-up among the services are possible.

The present invention has an effect of accurately identifying the intention of the user as a result of analyzing voice analysis data received from the AI server, the real-time trend data created by analyzing voices of other users, the user history data created by analyzing voices of the user, and the situation data including information on context of the user, etc.

The present invention has another effect of accurately identifying a request of the user by analyzing determined results of multiple intentions included in each data and matching scores representing suitabilities of each of the results using a certain algorithm.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device may work as more than a software module to perform the action of the present invention and they may do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for providing a vehicle Artificial Intelligence (AI) service, comprising steps of:
   (a) an AI service providing device, if a voice of a specific user is acquired from a voice receiver, supporting an AI server to extract from the voice (i) at least one of skill candidates each of which includes a service category and (ii) at least one of command candidates, to thereby create voice analysis data, and receiving the voice analysis data from the AI server; and
   (b) the AI service providing device (I) analyzing at least one of (i) first data including the voice analysis data, (ii) second data including real-time trend data created by analyzing voices of other users acquired within a certain time period, (iii) third data including user history data created by analyzing voices of the specific user acquired within a particular time period, and (iv) fourth data including situation data having information on context of the specific user, and then (II) recognizing an intention included in the voice of the specific user acquired at the step of (a) and determining a final skill and a final command which match the intention;
   wherein each of the first data, the second data, the third data, and the fourth data includes at least one of the skill candidates and at least one of the command candidates;
   wherein each of m-th data $\{m|m \in 1, 2, 3, 4\}$ includes (i) information on each of (m-k)-th skill scores which represents an extent of the intention analyzed for each of (m-k)-th skill candidates $\{k|k \in 1, 2, 3, \ldots, kk\}$ and (ii) information on each of (m-n)-th command scores $\{n|n \in 1, 2, 3, \ldots, nk\}$ which represents an extent of the intention analyzed for each of (m-n)-th command candidates;
   wherein, at the step of (b), if a specific command candidate among the command candidates has a highest score among (1-k)-th skill scores and (1-n)-th command scores included in the first data, the AI service providing device determines the specific command candidate as the final command, and selects the final skill from at least part of the skill candidates capable of executing commands corresponding to the specific command candidate;
   wherein, on condition that a-th skill candidates $\{a|a \in 1, 2, 3, \ldots, ak\}$ are among the at least part of the skill candidates capable of executing commands corresponding to the specific command candidate, the AI service providing device calculates each of a-th matching scores corresponding to the intention, for each of the a-th skill candidates by referring to an m-th weight factor which is a weight factor of the m-th data, to thereby determine a specific skill candidate with a highest score among the a-th matching scores as the final skill, wherein the a-th matching scores include respective summations of multiplications of the m-th weight factor by each skill score of the m-th data corresponding to each of the a-th skill candidates.

2. The method of claim 1, wherein, at the step of (b), if a specific skill candidate among the skill candidates has a highest score among (1-k)-th skill scores and (1-n)-th command scores included in the first data, the AI service providing device determines the specific skill candidate as the final skill, and selects the final command from at least part of the command candidates capable of performing skills corresponding to the specific skill candidate.

3. A method for providing a vehicle Artificial Intelligence (AI) service, comprising steps of:
   (a) an AI service providing device, if a voice of a specific user is acquired from a voice receiver, supporting an AI server to extract from the voice (i) at least one of skill candidates each of which includes a service category and (ii) at least one of command candidates, to thereby create voice analysis data, and receiving the voice analysis data from the AI server; and
   (b) the AI service providing device (I) analyzing at least one of (i) first data including the voice analysis data, (ii) second data including real-time trend data created by analyzing voices of other users acquired within a certain time period, (iii) third data including user history data created by analyzing voices of the specific user acquired within a particular time period, and (iv) fourth data including situation data having information on context of the specific user, and then (II) recognizing an intention included in the voice of the specific user acquired at the step of (a) and determining a final skill and a final command which match the intention;
   wherein each of the first data, the second data, the third data, and the fourth data includes at least one of the skill candidates and at least one of the command candidates;
   wherein each of m-th data $\{m|m \in 1, 2, 3, 4\}$ includes (i) information on each of (m-k)-th skill scores which represents an extent of the intention analyzed for each of (m-k)-th skill candidates $\{k|k \in 1, 2, 3, \ldots, kk\}$ and (ii) information on each of (m-n)-th command scores {n|n∈1, 2, 3, ..., nk} which represents an extent of the intention analyzed for each of (m-n)-th command candidates;

wherein, at the step of (b), if a specific skill candidate among the skill candidates has a highest score among (1-k)-th skill scores and (1-n)-th command scores included in the first data, the AI service providing device determines the specific skill candidate as the final skill, and selects the final command from at least part of the command candidates capable of performing skills corresponding to the specific skill candidate;

wherein, on condition that a-th command candidates {a|a∈1, 2, 3, ..., ak} are among the at least part of the command candidates capable of performing skills corresponding to the specific skill candidate, the AI service providing device calculates each of a-th matching scores corresponding to the intention, for each of the a-th command candidates by referring to an m-th weight factor which is a weight factor of the m-th data, to thereby determine a specific command candidate with a highest score among the a-th matching scores as the final command, wherein the a-th matching scores include respective summations of multiplications of the m-th weight factor by each score of the m-th data corresponding to each of the a-th command candidates.

4. A method for providing a vehicle Artificial Intelligence (AI) service, comprising steps of:
(a) an AI service providing device, if a voice of a specific user is acquired from a voice receiver, supporting an AI server to extract from the voice (i) at least one of skill candidates each of which includes a service category and (ii) at least one of command candidates, to thereby create voice analysis data, and receiving the voice analysis data from the AI server; (b) the AI service providing device (I) analyzing at least one of (i) first data including the voice analysis data, (ii) second data including real-time trend data created by analyzing voices of other users acquired within a certain time period, (iii) third data including user history data created by analyzing voices of the specific user acquired within a particular time period, and (iv) fourth data including situation data having information on context of the specific user, and then (II) recognizing an intention included in the voice of the specific user acquired at the step of (a) and determining a final skill and a final command which match the intention;

wherein each of the first data, the second data, the third data, and the fourth data includes at least one of the skill candidates and at least one of the command candidates;

wherein each of m-th data {m|M∈1, 2, 3, 4} includes (i) information on each of (m-k)-th skill scores which represents an extent of the intention analyzed for each of (m-k)-th skill candidates {k|k∈1, 2, 3, ..., $k_n$} and (ii) information on each of (m-n)-th command scores {n|n∈1, 2, 3, ..., $n_k$} which represents an extent of the intention analyzed for each of (m-n)-th command candidates;

wherein, at the step of (b), if a specific command candidate has a highest value among (i) values of respective multiplications of each of the (m-k)-th skill scores by an m-th weight factor which is a weight factor of the m-th data, and (ii) values of respective multiplications of each of the (m-n)-th command scores by the m-th weight factor, the AI service providing device determines the specific command candidate as the final command, and selects the final skill from at least part of the skill candidates capable of executing commands corresponding to the specific command candidate.

5. A method for providing a vehicle Artificial Intelligence (AI) service, comprising steps of:
(a) an AI service providing device, if a voice of a specific user is acquired from a voice receiver, supporting an AI server to extract from the voice (i) at least one of skill candidates each of which includes a service category and (ii) at least one of command candidates, to thereby create voice analysis data, and receiving the voice analysis data from the AI server, and
(b) the AI service providing device (I) analyzing at least one of (i) first data including the voice analysis data, (ii) second data including real-time trend data created by analyzing voices of other users acquired within a certain time period, (iii) third data including user history data created by analyzing voices of the specific user acquired within a particular time period, and (iv) fourth data including situation data having information on context of the specific user, and then (II) recognizing an intention included in the voice of the specific user acquired at the step of (a) and determining a final skill and a final command which match the intention;

wherein each of the first data, the second data, the third data, and the fourth data includes at least one of the skill candidates and at least one of the command candidates;

wherein each of m-th data {m|m∈1, 2, 3, 4} includes (i) information on each of (m-k)-th skill scores which represents an extent of the intention analyzed for each of (m-k)-th skill candidates {k|k∈1, 2, 3, ..., kk} and (ii) information on each of (m-n)-th command scores {n|n∈1, 2, 3, ..., nk} which represents an extent of the intention analyzed for each of (m-n)-th command candidates;

wherein, at the step of (b), if a specific skill candidate has a highest value among (i) values of respective multiplications of each of the (m-k)-th skill scores by an m-th weight factor which is a weight factor of the m-th data, and (ii) values of respective multiplications of each of the (m-n)-th command scores by the m-th weight factor, the AI service providing device determines the specific skill candidate as the final skill, and selects the final command from at least part of the command candidates capable of performing skills corresponding to the specific skill candidate.

6. The method of claim 1, wherein the third data includes information created by analyzing the voices of the specific user acquired within the particular time period at a particular area which includes a current location, wherein the particular time period contains at least one of (i) a certain past time window and (ii) a current time.

7. The method of claim 1, wherein the fourth data includes at least one of (i) vehicle information on at least one of a model name of a vehicle and a type of its engine; (ii) driving information on at least one of speed of the vehicle, its transmission operating mode, and its parking state; (iii) information on at least one of a location of the vehicle, direction of the vehicle and a name of a road on which the vehicle is in operation; (iv) situation information on at least one of a current time and current weather; and (v) app information on at least one application currently being executed in a device installed in or connected with the vehicle.

8. An Artificial Intelligence (AI) service providing device for providing a vehicle AI service, comprising:
a communication part for receiving voice analysis data from an AI server if the AI server acquires a voice of a specific user from a voice receiver, and extract from the voice (i) at least one of skill candidates each of which includes a service category and (ii) at least one of command candidates, to thereby create the voice analysis data; and a processor for (I) analyzing at least one of (i) first data including the voice analysis data, (ii) second data including real-time trend data created by analyzing voices of other users acquired within a certain time period, (iii) third data including user history data created by analyzing voices of the specific user acquired within a particular time period, and (iv) fourth data including situation data having information on context of the specific user, and then (II) recognizing an intention included in the voice of the specific user acquired from the communication part and determining a final skill and a final command which match the intention;

wherein each of the first data, the second data, the third data, and the fourth data includes at least one of the skill candidates and at least one of the command candidates;

wherein each of m-th data $\{m|m \in 1, 2, 3, 4\}$ includes (i) information on each of (m-k)-th skill scores which represents an extent of the intention analyzed for each of (m-k)-th skill candidates $\{k|k \in 1, 2, 3, \ldots, kk\}$ and (ii) information on each of (m-n)-th command scores $\{n|n \in 1, 2, 3, \ldots, nk\}$ which represents an extent of the intention analyzed for each of (m-n)-th command candidates;

wherein, if a specific command candidate among the command candidates has a highest score among (1-k)-th skill scores and (1-n)-th command scores included in the first data, the processor determines the specific command candidate as the final command, and selects the final skill from at least part of the skill candidates capable of executing commands corresponding to the specific command candidate;

wherein, on condition that a-th skill candidates $\{a|a \in 1, 2, 3, \ldots, ak\}$ are among the at least part of the skill candidates capable of executing commands corresponding to the specific command candidate, the processor calculates each of a-th matching scores corresponding to the intention, for each of the a-th skill candidates by referring to an m-th weight factor which is a weight factor of the m-th data, to thereby determine a specific skill candidate with a highest score among the a-th matching scores as the final skill, wherein the a-th matching scores include respective summations of multiplications of the m-th weight factor by each skill score of the m-th data corresponding to each of the a-th skill candidates.

9. The AI service providing device of claim 8, wherein, if a specific skill candidate among the skill candidates has a highest score among (1-k)-th skill scores and (1-n)-th command scores included in the first data, the processor determines the specific skill candidate as the final skill, and selects the final command from at least part of the command candidates capable of performing skills corresponding to the specific skill candidate.

10. An Artificial Intelligence (AI) service providing device for providing a vehicle AI service, comprising:

a communication part for receiving voice analysis data from an AI server if the AI server acquires a voice of a specific user from a voice receiver, and extract from the voice (i) at least one of skill candidates each of which includes a service category and (ii) at least one of command candidates, to thereby create the voice analysis data; and a processor for (I) analyzing at least one of (i) first data including the voice analysis data, (ii) second data including real-time trend data created by analyzing voices of other users acquired within a certain time period, (iii) third data including user history data created by analyzing voices of the specific user acquired within a particular time period, and (iv) fourth data including situation data having information on context of the specific user, and then (II) recognizing an intention included in the voice of the specific user acquired from the communication part and determining a final skill and a final command which match the intention;

wherein each of the first data, the second data, the third data, and the fourth data includes at least one of the skill candidates and at least one of the command candidates;

wherein each of m-th data $\{m|m \in 1, 2, 3, 4\}$ includes (i) information on each of (m-k)-th skill scores which represents an extent of the intention analyzed for each of (m-k)-th skill candidates $\{k|k \in 1, 2, 3, \ldots, kk\}$ and (ii) information on each of (m-n)-th command scores $\{n|n \in 1, 2, 3, \ldots, nk\}$ which represents an extent of the intention analyzed for each of (m-n)-th command candidates;

wherein, if a specific skill candidate among the skill candidates has a highest score among (1-k)-th skill scores and (1-n)-th command scores included in the first data, the processor determines the specific skill candidate as the final skill, and selects the final command from at least part of the command candidates capable of performing skills corresponding to the specific skill candidate;

wherein, on condition that a-th command candidates $\{a|a \in 1, 2, 3, \ldots, ak\}$ are among the at least part of the command candidates capable of performing skills corresponding to the specific skill candidate, the processor calculates each of a-th matching scores corresponding to the intention, for each of the a-th command candidates by referring to an m-th weight factor which is a weight factor of the m-th data, to thereby determine a specific command candidate with a highest score among the a-th matching scores as the final command, wherein the a-th matching scores include respective summations of multiplications of the m-th weight factor by each score of the m-th data corresponding to each of the a-th command candidates.

11. An Artificial Intelligence (AI) service providing device for providing a vehicle AI service, comprising:

a communication part for receiving voice analysis data from an AI server if the AI server acquires a voice of a specific user from a voice receiver, and extract from the voice (i) at least one of skill candidates each of which includes a service category and (ii) at least one of command candidates, to thereby create the voice analysis data; and a processor for (I) analyzing at least one of (i) first data including the voice analysis data, (ii) second data including real-time trend data created by analyzing voices of other users acquired within a certain time period, (iii) third data including user history data created by analyzing voices of the specific user acquired within a particular time period, and (iv) fourth data including situation data having information on context of the specific user, and then (II) recognizing an intention included in the voice of the specific user acquired from the communication part and determining a final skill and a final command which match the intention;

wherein each of the first data, the second data, the third data, and the fourth data includes at least one of the skill candidates and at least one of the command candidates;

wherein each of m-th data $\{m|m \in 1, 2, 3, 4\}$ includes (i) information on each of (m-k)-th skill scores which represents an extent of the intention analyzed for each of (m-k)-th skill candidates $\{k|k \in 1, 2, 3, \ldots, kk\}$ and (ii) information on each of (m-n)-th command scores $\{n|n \in 1, 2, 3, \ldots, nk\}$ which represents an extent of the intention analyzed for each of (m-n)-th command candidates;

wherein, if a specific command candidate has a highest value among (i) values of respective multiplications of each of the (m-k)-th skill scores by an m-th weight factor which is a weight factor of the m-th data, and (ii) values of respective multiplications of each of the (m-n)-th command scores by the m-th weight factor, the processor determines the specific command candidate as the final command, and selects the final skill from at least part of the skill candidates capable of executing commands corresponding to the specific command candidate.

12. An Artificial Intelligence (AI) service providing device for providing a vehicle AI service, comprising:

a communication part for receiving voice analysis data from an AI server if the AI server acquires a voice of a specific user from a voice receiver, and extract from the voice (i) at least one of skill candidates each of which includes a service category and (ii) at least one of command candidates, to thereby create the voice analysis data; and a processor for (I) analyzing at least one of (i) first data including the voice analysis data, (ii) second data including real-time trend data created by analyzing voices of other users acquired within a certain time period, (iii) third data including user history data created by analyzing voices of the specific user acquired within a particular time period, and (iv) fourth data including situation data having information on context of the specific user, and then (II) recognizing an intention included in the voice of the specific user acquired from the communication part and determining a final skill and a final command which match the intention;

wherein each of the first data, the second data, the third data, and the fourth data includes at least one of the skill candidates and at least one of the command candidates;

wherein each of m-th data $\{m|m \in 1, 2, 3, 4\}$ includes (i) information on each of (m-k)-th skill scores which represents an extent of the intention analyzed for each of (m-k)-th skill candidates $\{k|k \in 1, 2, 3, \ldots, kk\}$ and (ii) information on each of (m-n)-th command scores $\{n|n \in 1, 2, 3, \ldots, nk\}$ which represents an extent of the intention analyzed for each of (m-n)-th command candidates;

wherein, if a specific skill candidate has a highest value among (i) values of respective multiplications of each of the (m-k)-th skill scores by an m-th weight factor which is a weight factor of the m-th data, and (ii) values of respective multiplications of each of the (m-n)-th command scores by the m-th weight factor, the processor determines the specific skill candidate as the final skill, and selects the final command from at least part of the command candidates capable of performing skills corresponding to the specific skill candidate.

13. The AI service providing device of claim 8, wherein the third data includes information created by analyzing the voices of the specific user acquired within the particular time period at a particular area which includes a current location, wherein the particular time period contains at least one of (i) a certain past time window and (ii) a current time.

14. The AI service providing device of claim 8, wherein the fourth data includes at least one of (i) vehicle information on at least one of a model name of a vehicle and a type of its engine; (ii) driving information on at least one of speed of the vehicle, its transmission operating mode, and its parking state; (iii) information on at least one of a location of the vehicle, direction of the vehicle and a name of a road on which the vehicle is in operation; (iv) situation information on at least one of a current time and current weather; and (v) app information on at least one application currently being executed in a device installed in or connected with the vehicle.

* * * * *